United States Patent [19]
Vignaud et al.

[11] 3,869,946
[45] Mar. 11, 1975

[54] REPRODUCTION LATHE

[75] Inventors: Jean-Pierre Vignaud; Bernard Leguy, both of Billancourt, France

[73] Assignee: Regie Nationale des Usines Renault, Boulogne-Billancourt, France

[22] Filed: Jan. 10, 1974

[21] Appl. No.: 432,234

[30] Foreign Application Priority Data
Mar. 15, 1973 France .............................. 73.09335

[52] U.S. Cl. ............................................. 82/14 R
[51] Int. Cl. ............................................. B23b 3/28
[58] Field of Search ................................... 82/14 R

[56] References Cited
UNITED STATES PATENTS

| | | | |
|---|---|---|---|
| 2,233,398 | 3/1941 | Carlin | 82/14 X |
| 2,316,405 | 4/1943 | Clausen | 82/14 |
| 2,330,921 | 10/1943 | Rickenmann | 82/14 X |
| 3,156,144 | 10/1964 | Weaver | 82/14 |
| 3,194,092 | 7/1965 | Piotrowski | 82/14 |

Primary Examiner—Harrison L. Hinson
Attorney, Agent, or Firm—Oblon, Fisher, Spivak, McClelland & Maier

[57] ABSTRACT

A reproduction lathe for the manufacture of articles by means of a tool having associated therewith a sensing device to be guided by means of a reproduction template includes a framework upon which are mounted two rotating parallel spindles carrying respectively the article for manufacture and the reproduction template, a machine carriage including a sheath which surrounds the spindle associated with the reproduction template and which is translatable along its axis and rotatable about such axis. The apparatus can be provided with more than one tool, each of which can be disposed perpendicularly to a plane which includes the spindle axis, for accomplishing different machining operations, and membranes are provided through which the tool members are perpendicularly fixed, laterally supported, and axially guided relative to the sheath while protecting the template from chips and shavings generated as a result of the machining process. Means are also provided for adjusting the relative axes of the article to be machined and the template.

21 Claims, 14 Drawing Figures

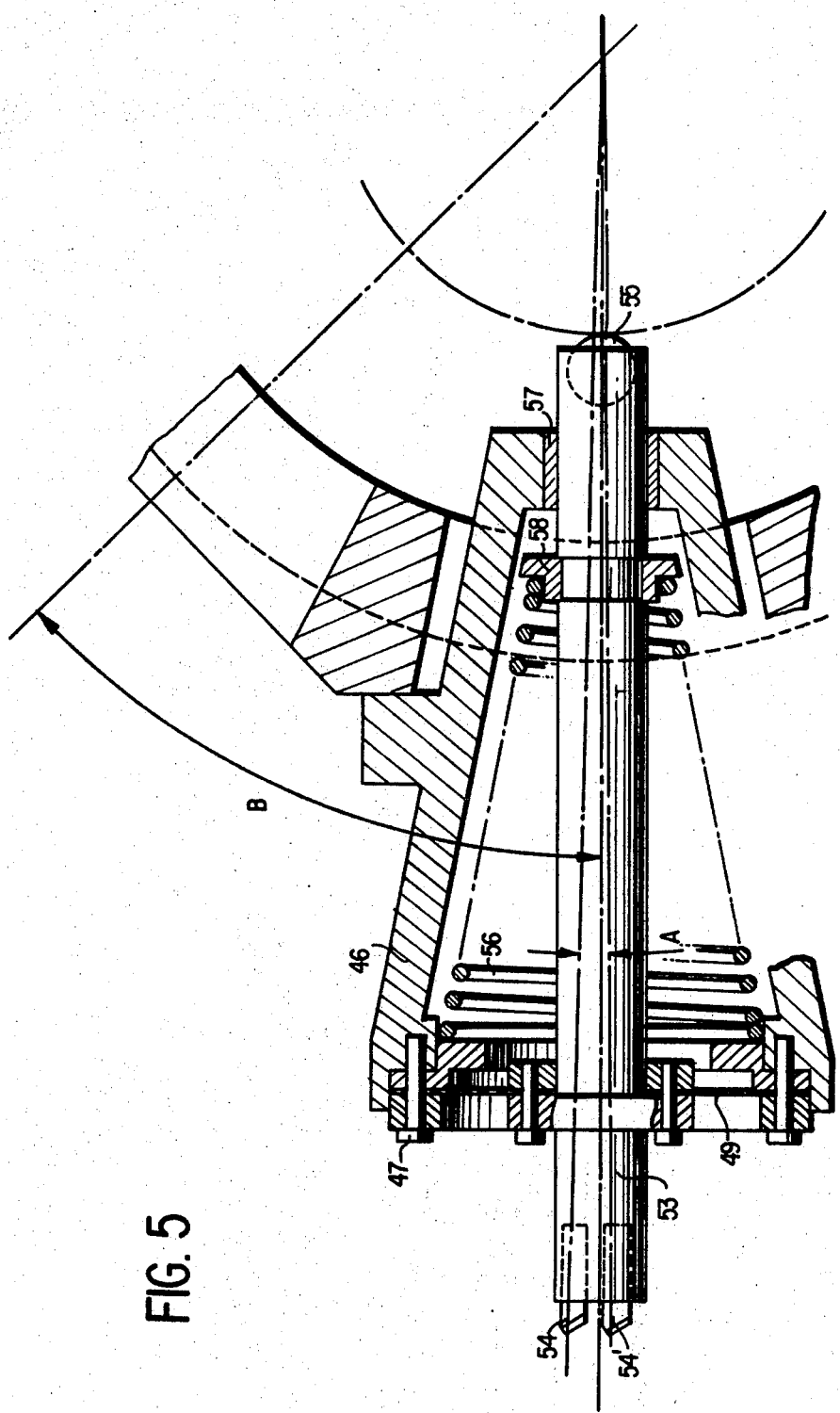

REPRODUCTION LATHE

BACKGROUND OF THE INVENTION

1. Field of the Invention

The present invention relates generally to reproduction lathes and more particularly to a reproduction lathe which may be employed for the manufacture and machining of non-cylindrical articles otherwise not suitable for machining by rotary means, such as for example, internal combustion engine pistons, especially of moderate and large sized engines.

2. Description of the Prior Art

The configuration of pistons, which were cylindrical orignally, has evolved with time so as to presently include for example, pistons having a conical head or an elliptical transverse cross-section. In taking into account numerous considerations, such as for example, wear and tear, expansion, balance, and lubrication, still other more elaborate configurations have been employed. In addition, there has been introduced into practice, the employment of inserts, during the casting operation, for facilitating the proper placement of the combustion chamber section and to associate therewith the known helicoidal grooves upon the rear edge of the piston head. Still further, it is necessary to maintain surface quality and obtain side tolerances with substantially reduced "mini-maxi" forks.

Toolmakers and machine manufactureers have corrected and refined their lathes so as to be capable of manufacturing and machining new specially configured surfaces with the use of simple templates, and with reproduction mechanisms rotating at an angular speed two times greater than or equal to that of the piston and nevertheless capable of producing a surface lacking any substantial variations, and they are equally capable of making corrections so as to achieve the required tolerances.

Heretofore, with known machines however, the weight of movable equipment, the flexibility of the connecting components, and the time of response, in connection with hydraulic or pneumatic transmissions, between the contact strokes of the reproduction device and the tool, has limited the rotational speed of the components and consequently production capacity. In addition, a substantial number of the conventional machines are of the individual spindle type for performing various machining operations and not easily adaptable to the present machining requirements, each machine therefore being required to be employed within a continuous chain of manufacture. Moreover, the special machines, for releasing or withdrawing of the inserts, and for machining of the grooves upon the edges of the piston head, are operated separately from the basic machining apparatus for performing the final finishing phases upon the surfaces of the articles. Still further, correction for successive dimensions corresponding to and compensating for the wearing of the tool has led to the conclusion that certain dimensions cannot be attained.

Yet further, upon certain recent conventional machines, in order to diminish the inertia of articles during alternate modes of motion, the reproduction template has been placed adjacent the article to be machined. Consequentially, however, the template is often struck by chips, shavings, or lubricant whereupon such template becomes defective, significant damage to such resulting in a ne essitated reduction in the rotational speed of the machining components. When the manufacturer has sought to place the template in a sheltered location, the distance between the template and the article to be machined has been substantially increased leading once again to the inertial response of the articles during alternate modes of motion and a reduction in the rotational velocity has been necessary.

SUMMARY OF THE INVENTION

Accordingly, it is an object of the present invention to provide a new and improved reproduction lathe.

Another object of the present invention is to provide reproduction lathe apparatus which avoids the inconveniences mentioned above.

Still another object of the present invention is to provide an improved reproduction lathe wherein the reproduction template and the article to be machined are disposed near each other while maintaining the template and its associate sensing device within a lubricating medium entirely enclosed and protected from the chips and shavings generated during the machining operation, thereby permitting increased rotational speeds of operation.

Yet another object of the present invention is to provide an improved reproduction lathe wherein the carriage bearing the tool and sensor may be operated between extreme limits for performing the machining operations and is mounted without friction and so as to exhibit large lateral rigidity thereby permitting a driving belt of high frequency to drive the same and thereby achieve rapid cutting speeds.

A further object of the present invention is to provide an improved reproduction lathe wherein it is possible to utilize two tools employed in succession for performing a rough finishing operation and a fine finishing operation.

A yet further object of the present invention is to provide an improved reproduction lathe whereby production can be substantially increased due to the increased machining speeds and overall reduction in time required for the machining operations.

A still further object of the present invention is to provide an improved reproduction lathe which is adapted to be included within an assembly line type of manufacturing apparatus.

A still yet further object of the present invention is to provide an improved reproduction lathe wherein, in addition to being capable of providing predetermined profiles upon the peripheral surfaces of the articles, such apparatus is also capable of performing special machining operations necessitating sudden movements of the tool, withdrawal of the piston inserts, and the production of helicoidal grooves upon the outer edges of the pistons.

A yet still further object of the present invention is to provide an improved reproduction lathe wherein it is possible to automatically correct dimensional discrepancies due to the wear of the tool or to expansion.

Yet still another object of the present invention is to provide an improved reproduction lathe wherein it is possible to mount a plurality of profiling tools and "draining" tools, so as to effect successive strokes in the machining process so as to obtain, for example, the seating of the piston rings.

It is a further object of the present invention to provide an improved reproduction lathe which is simple and provides ready accessibility so as to enable the ob-

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 5 is a cross section view of a modification of a detachable support means for the tool holder and the sensor;

DETAILED DESCRIPTION OF THE PREFERRED EMBODIMENTS

Figure 1:
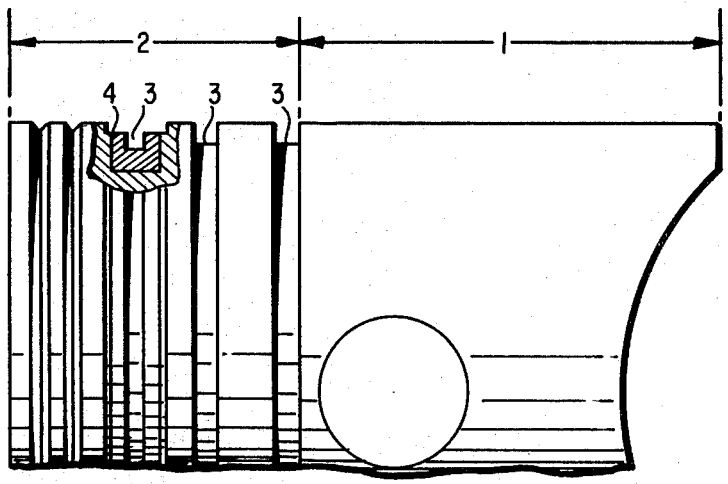
FIG. 1 is an elevation view of a internal combustion engine piston.

Referring now to the drawings, and more particularly to FIG. 1 thereof, there is shown the article for manufacture which comprises an internal combustion engine piston including a smooth skirt portion 1 and a head portion 2 having formed therein peripheral grooves 3 adapted to receive the piston rings and a cast insert 4 within which is mounted a firing piston ring, the lathe constructed according to the present invention being designed for the manufacturing of such pistons.

Figure 2:
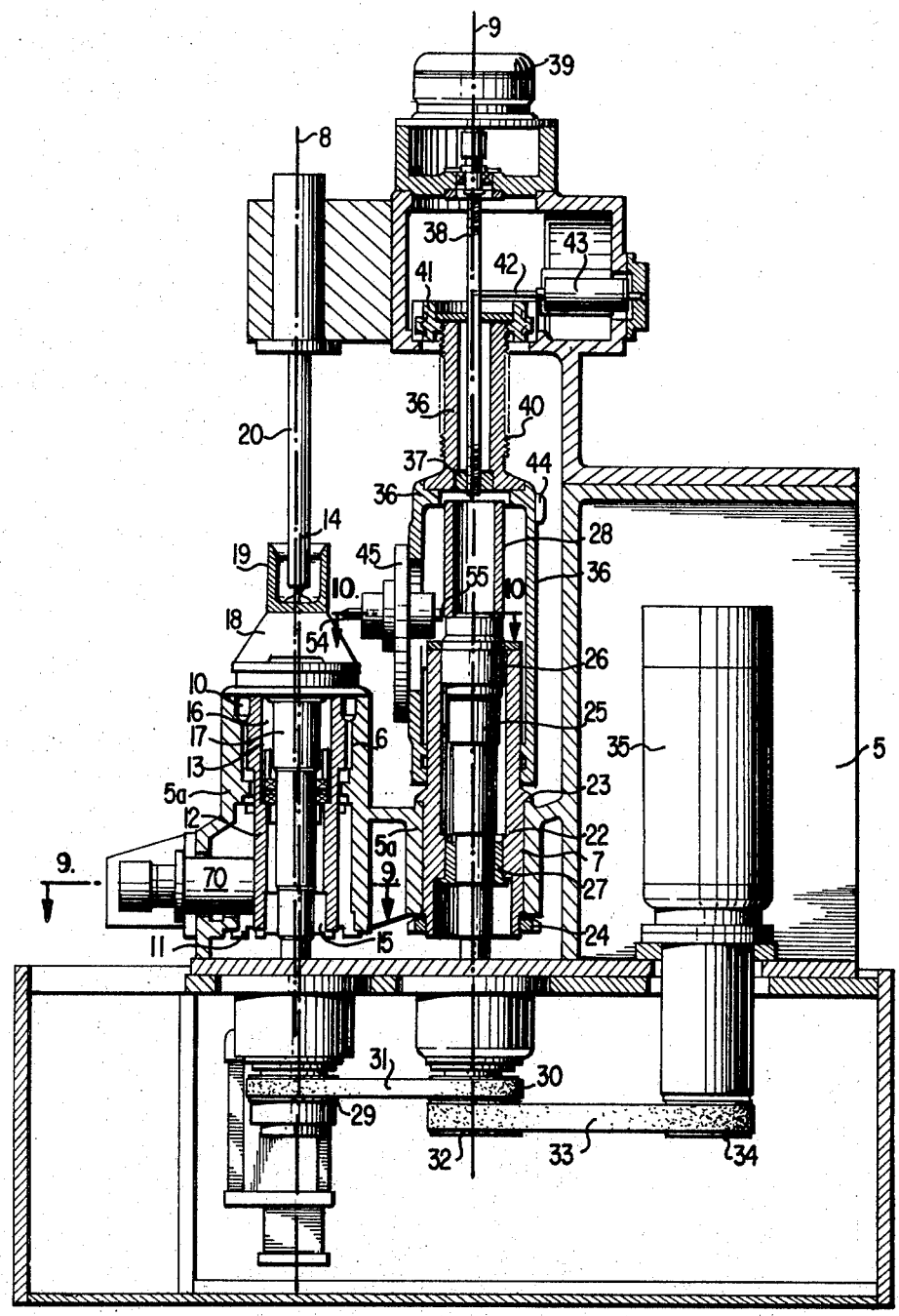
FIG. 2 is a side elevation view, partly in cross-section, of a reproduction lathe constructed according to the present invention and showing its cooperative parts.
Figure 3:
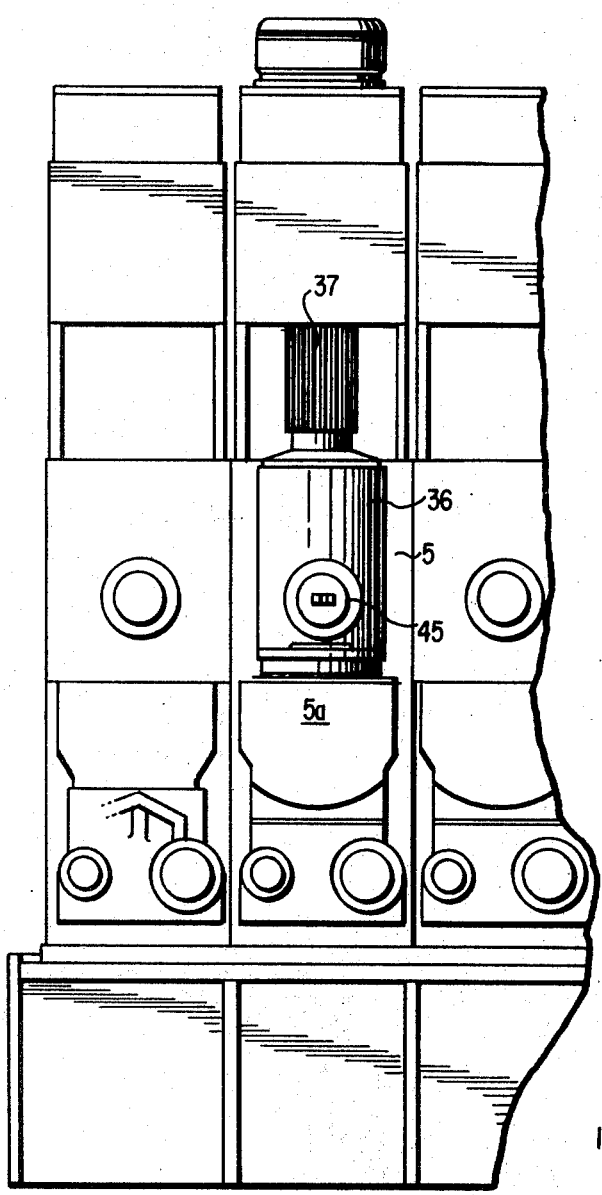
FIG. 3 is a front elevation view of the reproduction lathe of FIG. 2, aligned with two other machines of the same type.

Referring then to FIGS. 2 and 3, the reproduction lathe constructed according to the present invention includes a C-shaped framework or bedplate 5, the forward extending section 5a of which is provided with two vertically extending, parallel bores 6 and 7, the axes of which are designated at 8 and 9. Within bore 6 there is mounted a sheath or casing 12 which is pivotable about axis 8 by means of bearings or bushings 10 and 11 and which is provided with an eccentric bore 13, the axis 14 of which extends parallel to axis 8. Within bore 13 there is in turn mounted, upon hydrodynamic bearings 15 and 16 or the like, a spindle 17 which by means of a tapered nose portion 18 carries the article-to-be-machined 19. Article 19 is maintained upon the nose member 18 during the machining operation by means of an upstanding shaft 20 of a screw jack 21, nose member 18 being furnished with diamond points which permit fixing, by adherence, of the piston 19 to nose 18 by means of the piston head face. Other means of securing the article, such as for example, mandarins, are of course able to be employed, and similarly, the jack shaft 20 can be furnished with an arrangement not shown, which permits piston 19 to rotate.

Within the bore 7, there is similarly fixed a casing 2 which is flangedly supported and maintained upon a shoulder 23 of framework 5 by means of a nut 24 engaging the lower portion thereof, a rotary spindle 25, mounted within bearing 26 and 27, being disposed within casing 22. A reproduction template 28 is mounted upon spindle 25 in a known manner, the mounting of spindle 25 being preferably similar to that of spindle 17 such that as the expansion of the two spindles are the same, the relative elevated positions, of the article to be machined 19 and the template 28 remain unchanged.

The spindles 17 and 25 are drivingly interconnected by means of an appropriate combination of respectively associated notched pulleys 29 and 30 and a toothed belt 31 extending therebetween. Upon the same axis as the pulley 30 is disposed another pulley 32 which is connected, by means of another belt 33, with still another pulley 34 disposed upon the end of the drive shaft of a motor 35 mounted upon the framework 5. The pulleys 29 and 30 are of the same diameter and contain the same number of teeth whereby the spindles associated with article 19 and the template holder 28 may be rotated at the same angular velocity. It is of course equally possible, if so desired, to rotate spindle 17 at an angular velocity W while rotating the template spindle 25 at an angular velocity of W/2, W/3, W/4 or the like depending upon the relation between pulleys 29 and 30. Similarly, the spindle 25 may be rotated with an angular velocity of 2W, 3W or the like, such that in practice, the reproductions are executed accordingly.

Sheath or casing 12 is removable from bore 6, by means which will be described in more detail hereinafter, in order to correct, upon assembly of the machine, any defect in the parallel alignment between the axis of the sheath 12 and that of the spindle 25. Similarly, removal of casing 12 facilitates the regulation of the interval between the axes of spindle 17 and spindle 25, either manually or automatically, at the time of changing of a tool or in order to correct for differences in the diameters of successive manufactured articles, such as for example, due to an expansion of the framework or bed-plate. The axis interval between spindles 17 and 25 may therefore be rapidly altered, and any variances in the tool may also be compensated for. Still further, the relative angle between the axis of the sheath 12 and the axis of the spindle 25 associated with the template holder 28 may also be corrected or adjusted should a defect within the reproduction template be present.

Still referring to FIGS. 2 and 3, upon the sheath 22 there is slidably mounted a tool carrying carriage which comprises a working sheath 36 annularly surrounding the reproduction template 28 and to which is secured a nut 37 with which there is engaged a screw 38 driven by means of a motor 39. Upon the exterior periphery of sheath 36 there is provided keying grooves and channels 40 with which there is engaged a crown 41 which is provided with teeth by which it is geared with a rack 42 driven by means of a screw jack 43, secured to the framework 5. This entire arrangement operates so as to render the sheath 36 slidable with respect to axis 9 and also pivotable about axis 9.

Upon the exterior periphery of sheath 36 there are mounted a plurality of cams 44 which actuate various electrical contacts in order to control such diverse operations as stopping the motors, activating the rotational drive means of spindles 17 and 25, stopping the vertical advance and reversing the direction of vertical travel pivoting of the sheath 36, and the like. In addition, there is also mounted upon sheath 36 at least one detachable cartridge 45 which consists of a least one tool and a sensor oriented within the plane $XX_1$ which is perpendicular to the axes 8 and 9.

Figure 4:
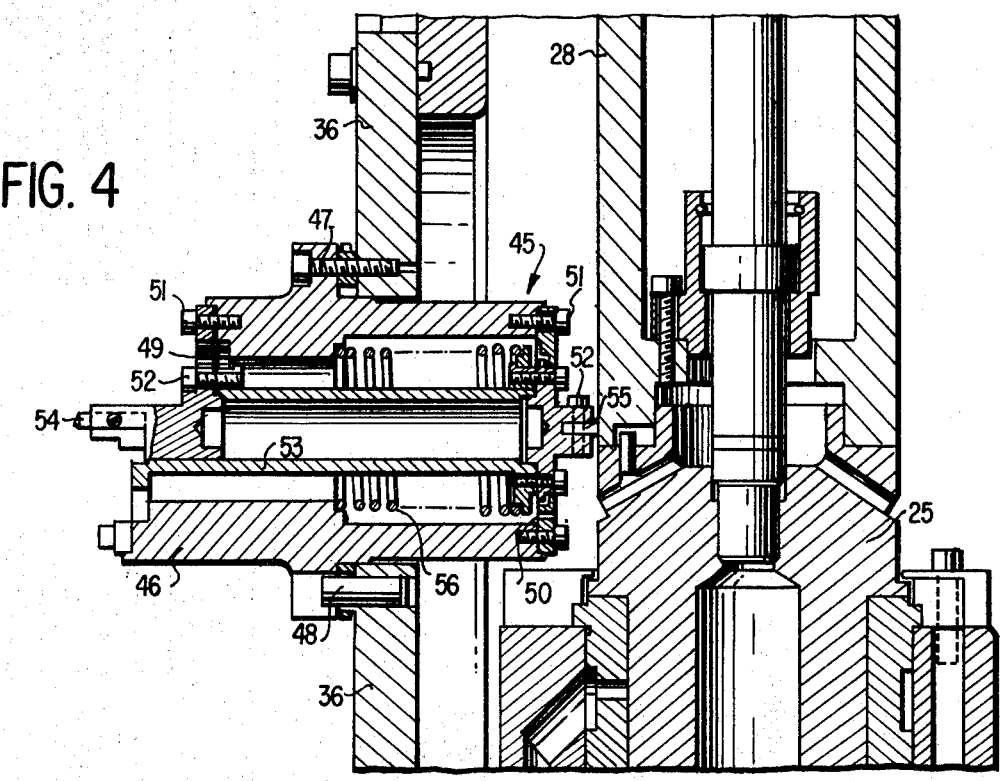
FIG. 4 is a cross section view of the detachable support means for the tool holder and sensor.
Figure 6:
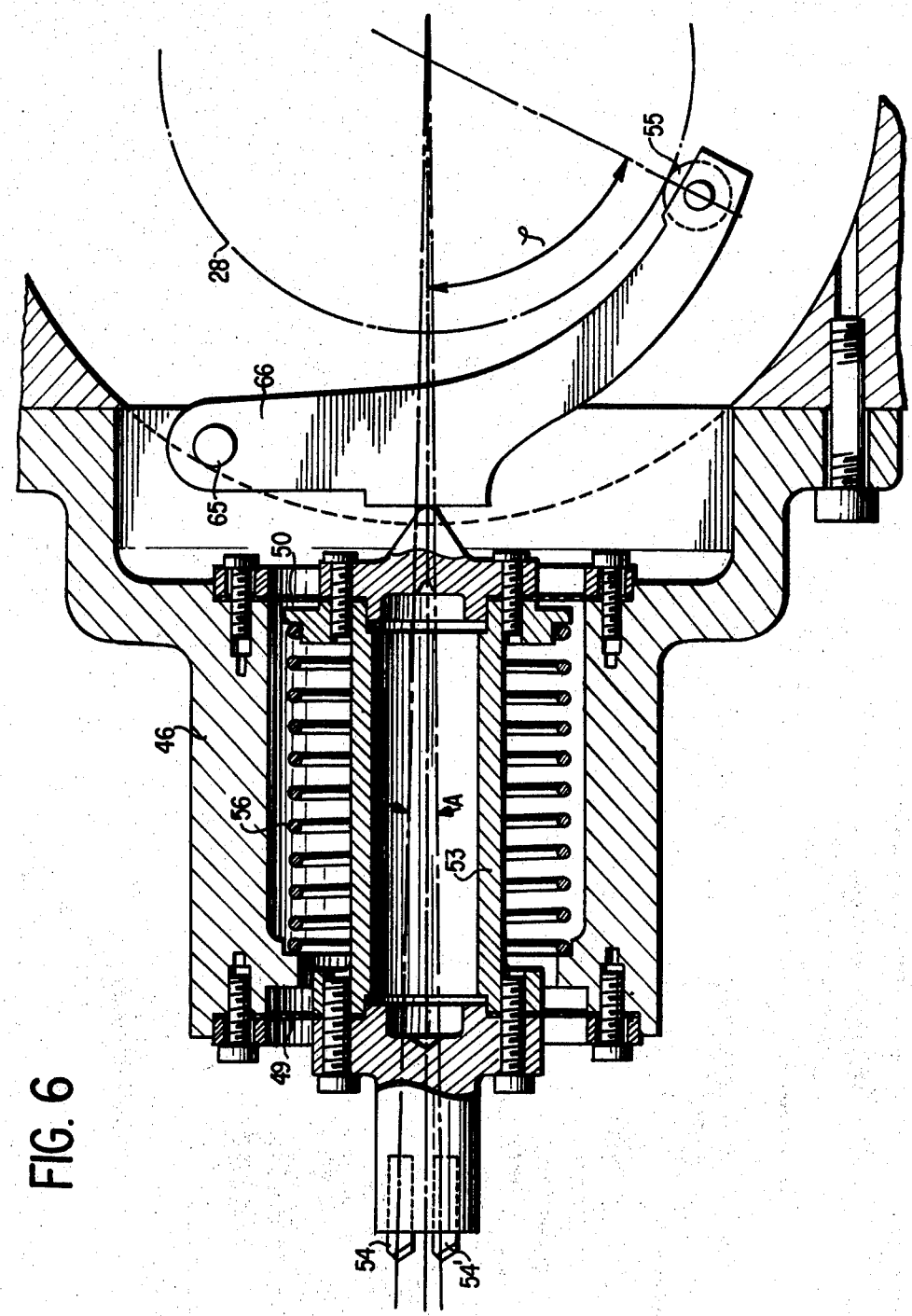
FIG. 6 is a cross section view of still another embodiment of the tool support and sensor holding means.

The cartridge, shown in detail in FIG. 4, comprises a support member 46 which is fixed upon the sheath 36 by means of a plurality of screws 47 and dowels 48, support 46 having mounted thereon elastic membranes 49 and 50 which are secured by means of screws 51 and 52. A rod 53 is also secured upon member 46 and such rod is adapted to support at one end thereof a tool 54 or a plurality of tools 54 and 54', as seen in FIGS. 5 and 6, which are capable of coming in contact with the article to be machined 19 while at the other end thereof, the rod is adapted to support a sensor 55 which is in contact with the reproduction template 28. The elastic membranes 49 and 50 may be made of thin metallic leaves and a spring 56, disposed within the support body 46, is adapted to bias the rod 53 in the direction of the template 28 so as to constantly bias the sensor 55 against the template 28.

One of the two annular membranes 49 and 50, such as for example membrane 49, at one side of the tool is secured between the body 46 and the rod 53 in such a manner as to prevent the rod from rotating. In addition, the membranes, notably membrane 49, is impervious whereby sheath 36, the reproduction template 28, and the sensor 55 remain protected from dust and shavings generated within the machining area, it being possible to lubricate such components by means of sprinkling or spraying the same with oil or housing the same within a lubricating medium. In order to change the cartridge 45 or have access to template 28, it is only necessary to disengage the screw 47 or the nuts of the dowels 48.

In order to reduce the axial pressure exerted upon the surface of the template 28 the cartridge 45 is able to mount a single membrane. In the embodiment of FIG. 5, only one membrane can be employed that is, membrane 49, due to the fact that the rod 53 is guided at the other extremity thereof within a guide block or bearing 57 mounted within support body 46 while the spring 56 is interposed between a base member, not numbered, of the member 46 and a bushing 58 secured upon the periphery of rod 53.

In the instance that the rod supports two tools 54 and 54', the tool 54 is initially placed within the plane of the axes 14 and 8, and upon descent of the sheath 36, execution of a run comprising rough definition is performed. Subsequently, pivoting of sheath 36 through an angle A at the critical low position of the sheath permits the positioning of the tool 54' within the plane of the axes 14 and 18, and consequently, upon repositioning of the sheath 36 to its original raised position, the tool 54' is able to execute a run of fine definition.

In the instance where only a single tool 54 is capable of being secured within the rod 53, as seen in FIG. 4, the sheath 36 carries only a single cartridge 45 and the lathe performs only a single operation, that is, rough definition or fine definition, the work pass being executed upon descent of the sheath. The sheath 36 is then pivoted through an angle A when the sheath is at the critical low position so as to disengage the tool from the article during the remounting or repositioning of the sheath.

Figure 12:
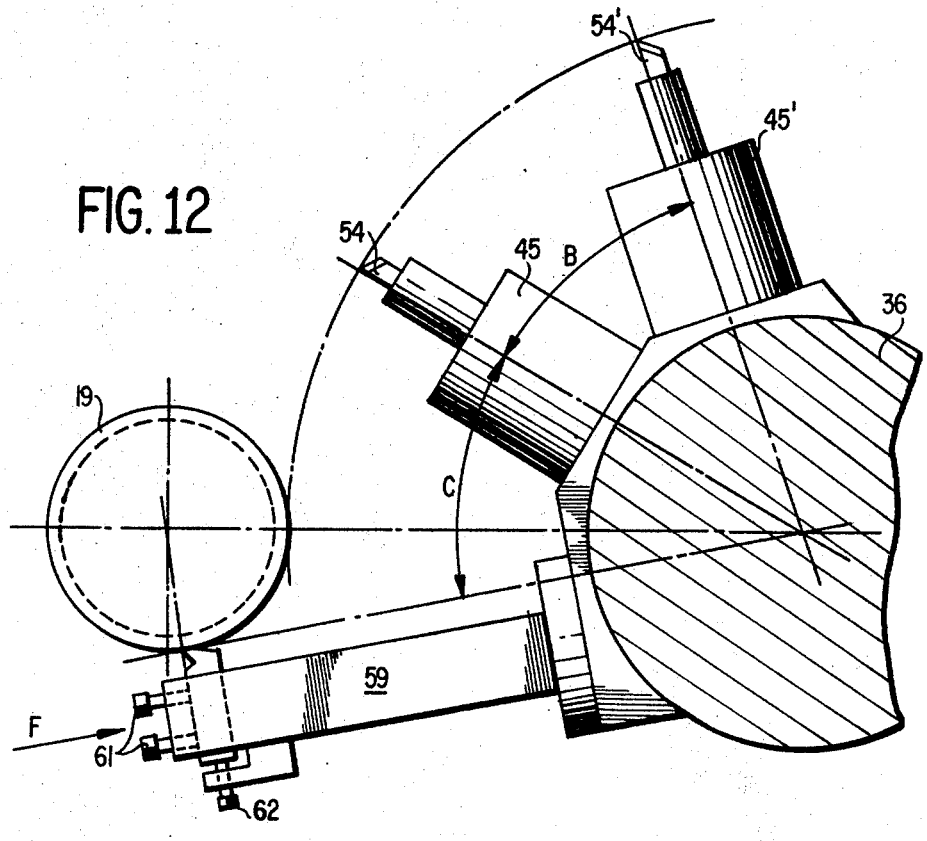
FIG. 12 is a schematic plan view showing the mounting of the drainage and chamfering tools for machining the grooves of the piston rings.

It is equally possible to mount two cartridges 45 and 45' which are spaced angularly with respect to each other, the angle of separation B being, for example, 45° as represented in FIG. 12, when the lathe is to perform two operations, that is, rough definition and fine definition. The rough definition pass will be made by means of the tool 54', subsequent to which, a pivoting of the sheath 36 through the angle B, while the sheath is at the critical low point is effected so as to bring the tool 54 for fine definition into contact with the article for the execution of the fine finish phase to be performed during the remounting or repositioning of the sheath.

Referring now to FIG. 6, there is shown another cartridge 45 which is quite similar to the cartridge of FIG. 4 wherein the rod 53 supporting the tools 54 and 54' has associated therewith the membranes 49 and 50. In addition, a lever 66 adapted to be pivoted about an axis 65, is secured to the body member 46, the end of the lever 66 which is farthest from the axis 65 serving to carry a sensor 55 which is in contact with template 28. The spring 56 is interposed between a shoulder, not numbered, of member 46 and a flanged portion of rod 53 for biasing the latter into contact with the lever 66 whereby contact between the sensor 55 and the template 28 is assured. It is of course apparent that the reproductive template 28 should be rotated through an angle $\phi$ relative to the axis of rod 53 due to the offset position of sensor 55 relative to such axis.

Figure 7:
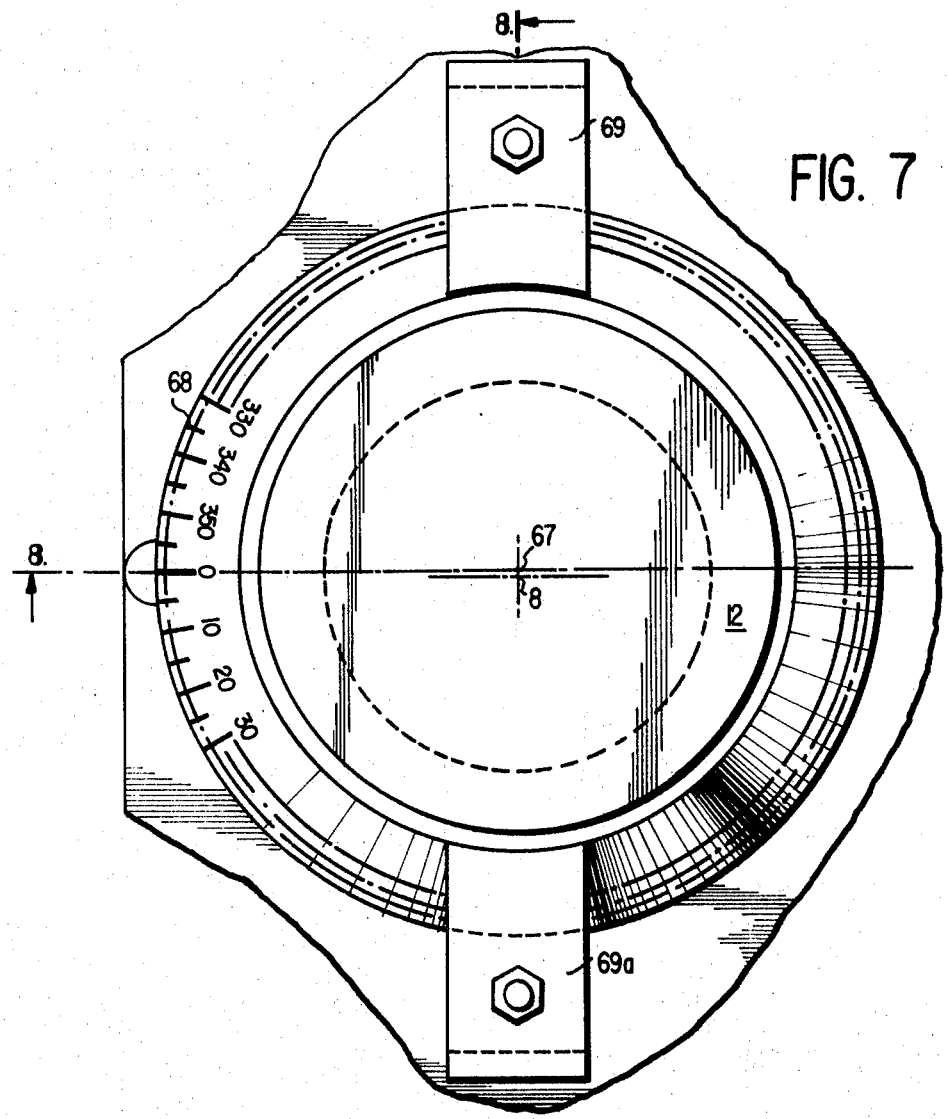
FIG. 7 is a plan view of the upper bearing assembly associated with the casing of the article holding spindle.
Figure 8:
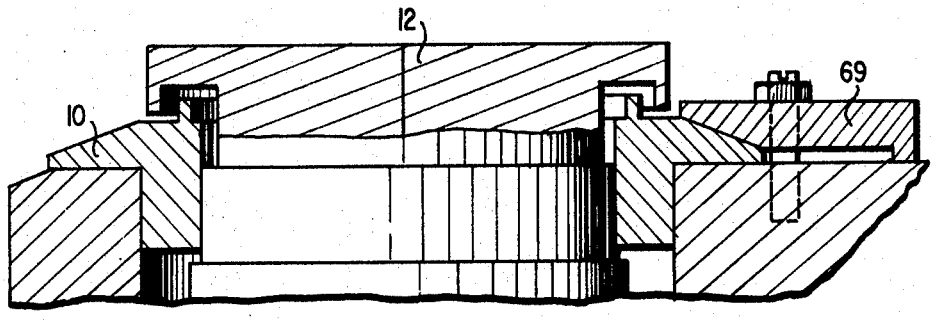
FIG. 8 is a cross section view taken along line VIII—VIII of FIG. 7.

As seen in FIGS. 7 and 8, the bushing 10 within which the sheath 12 is mounted and the axis of which is shown at 67, may be slightly eccentric relative to axis 8 of sheath 12, whereby rotation of the bushing 10, as noted upon scale 68, the inclination of the sheath 12 can be slightly modified whereby the axes of the spindles 17 and 25 may be aligned in parallel fashion. There can of course also be effected a false parallel alignment in order to correct for minute errors as a result of the operation of the reproducting template, the angles of such false parallel alignment being measured in the usual manner with a comparison device permitting adjustment thereof. The scale 68 also permits the making of necessary corrections at the time of a change in the reproduction template during the course of manufacture, and when the adjustment is effected, the bushing is retained in place by means of the diametrically opposed clocks 69 and 69a.

Figure 9:
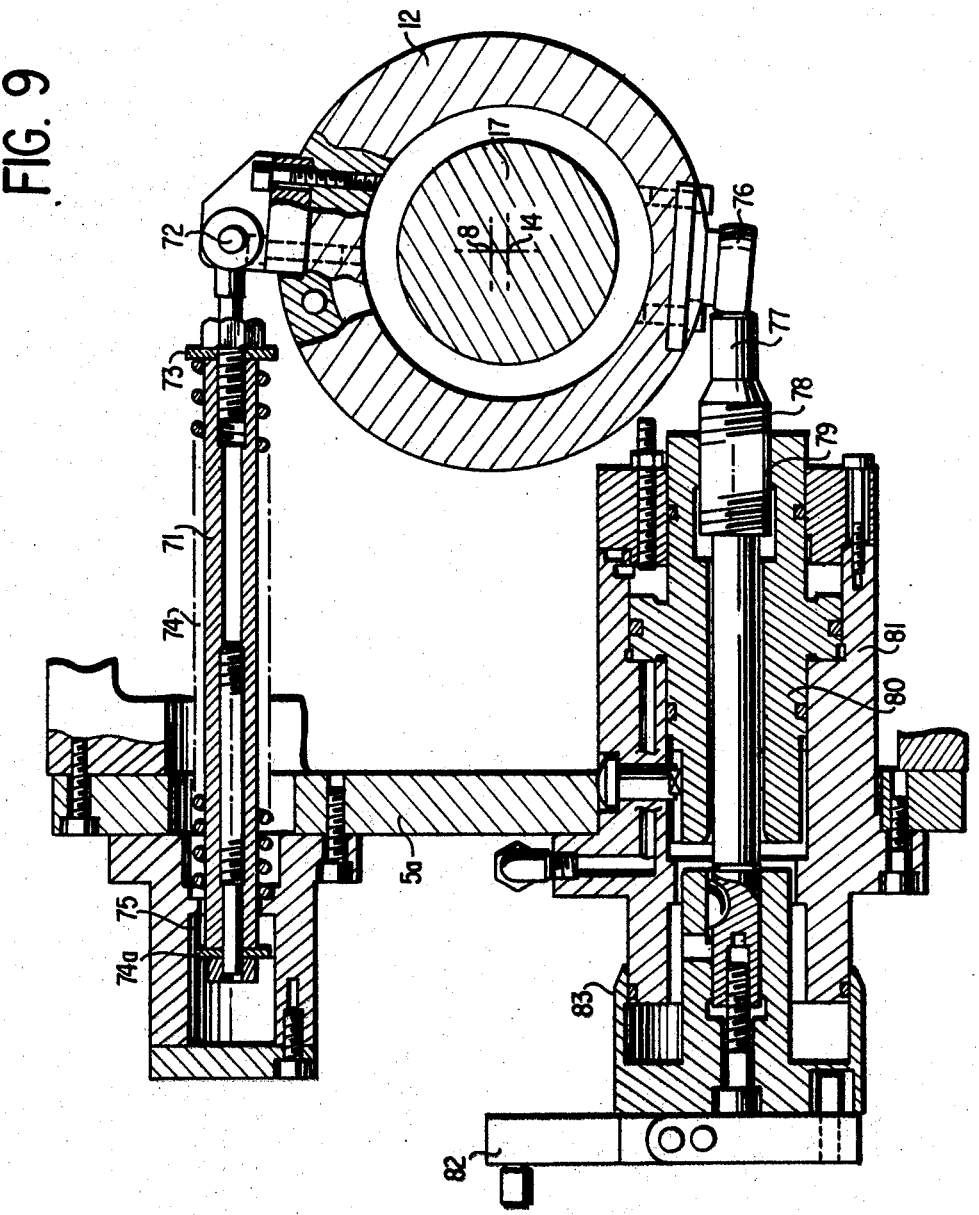
FIG. 9 is a cross section view taken along line IX—IX of FIG. 2.

Referring now to FIG. 9, there is shown apparatus 70 for effecting variations in the spacing between spindles 17 and 25. Such apparatus includes a rod 71 which is hinged about an axle 72 mounted upon sheath 12 and which is slidably mounted within section 5a of the framework. Rod 71 includes a shoulder 73 to which one end of coil spring 74, which is disposed about rod 71, is secured, while the other extremity of spring 74 abuts against a shoulder 75 of section 5a of the framework. An abutment washer 74a is disposed upon the opposite end of rod 71 so as to abut the other abutment surface of shoulder 75 than that associated with coil spring 74. In this manner, spring 74 constantly tends to rotate sheath 12 in a clockwise direction about axis 8. However, at a point diametrically opposed to the hinge axis 72, the sheath 12 is also furnished with an end fitting 76. Fitting 76 is connected to a rod 77 which carries a threaded member 78 threadably engaged within a tapping 79 formed within a piston 80 of a screw jack, the body 81 of which is secured to section 5a of the framework. A crank 82 is connected with the rod 77, whereby rotation of the latter, pivoting of the sheath 12 in a counterclockwise direction is attained. Consequently, due to the fact that the axis 14 of spindle 17 is eccentric to the axis 8 of the sheath 12, the spacing between spindles 17 and 25 is accordingly adapted to be modified. Movement of piston 80 also permits the rapid pivoting of sheath 12 whereby a rapid reduction in the spacing between spindles 17 and 25 may be obtained. The scales 83 are of course provided as a vernier whereby control of the desired spacing may be obtained.

Figure 10:
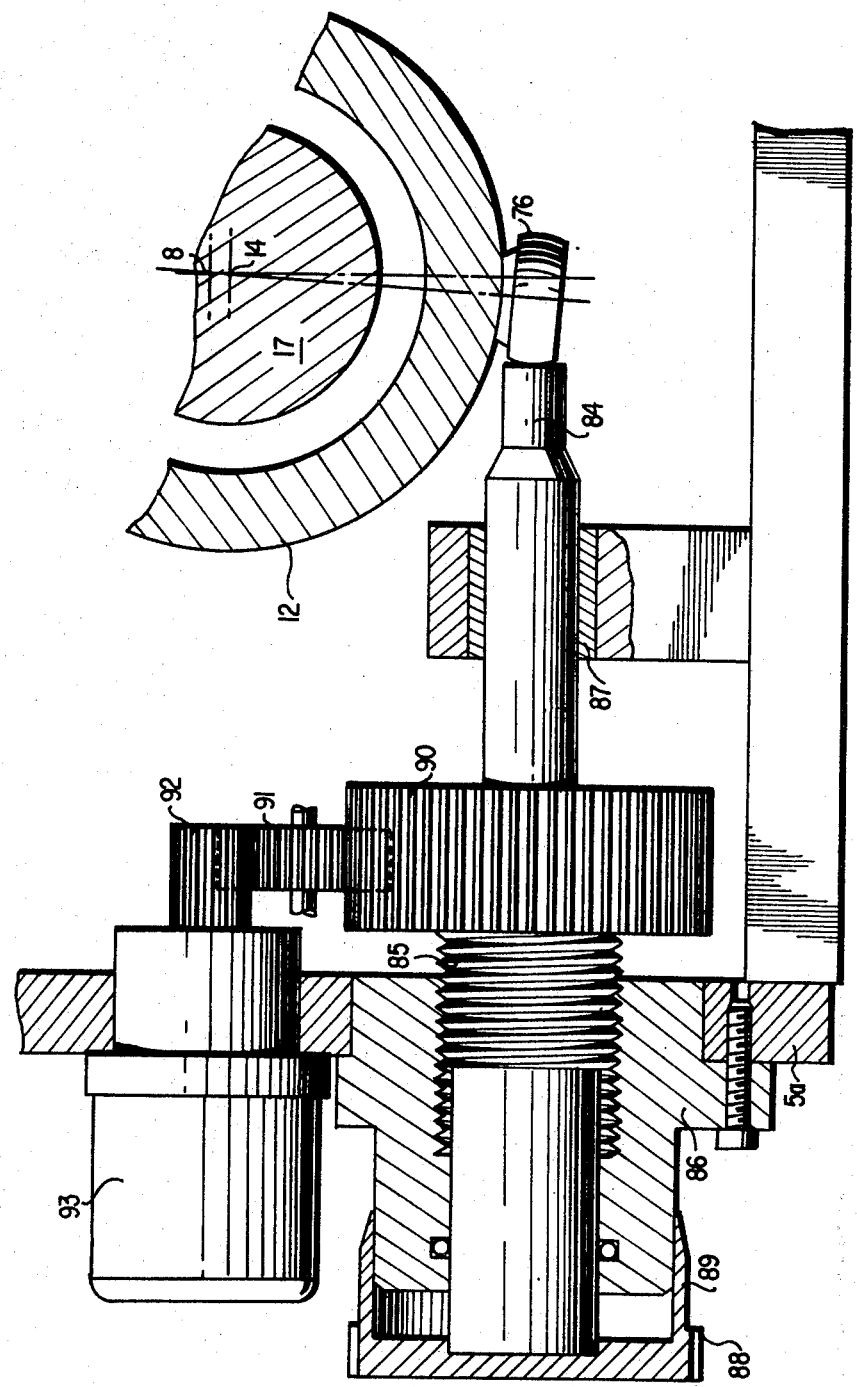
FIG. 10 is a view similar to that of FIG. 9, showing however a second embodiment of such apparatus.

Turning now to FIG. 10, there is disclosed a modification of the apparatus of FIG. 9, spring 74 having been omitted for clarity purposes although its mode of action is identical to that within the apparatus of FIG. 9. The noted modification resides in the connecting means associated with the end fitting 76 and is seen to include a thrust rod 84 which has associated therewith a threaded portion 85 which threadedly cooperates with a nut 86 secured to section 5a of the framework, the right end of rod 84 being supported within a bushing 87 which is also secured to the framework.

At its extremity opposite the end fitting 76, the rod 84 has secured thereto a knurled ring 88 which facilitates the manual rotation of sheath 12 in one direction or another in accordance with the indicating means upon the scales 89. Also disposed upon the rod 84 is a toothed gear 90 which is adapted to be rotated by means of a pinion 91 which is in turn rotated by means of another pinion 92 provided upon the drive shaft of a motor 93. Consequently, by actuating motor 93, in an arrangement proportionately sized, it is possible to correct the spacing between the spindles 17 and 25 in order to compensate for wear of the tools.

Figure 13:
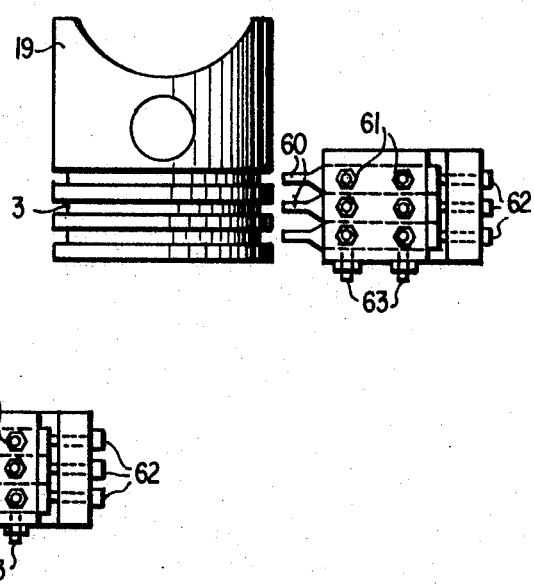
FIG. 13 is an elevation view looking in the direction of the arrow F of FIG. 12 with the drainage tools in operation.
Figure 14:
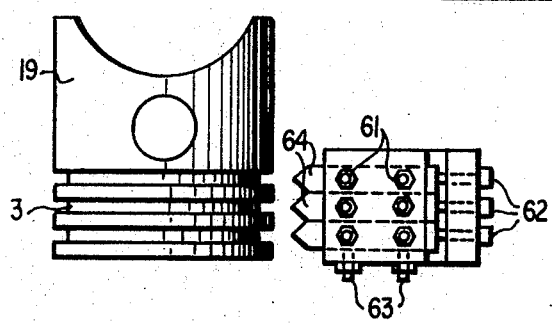
FIG. 14 is an elevation view similar to that of FIG. 13, showing however the chamfering tools in operation.

As to other arrangements which achieve rapid feeding and withdrawl of the mechanisms, other than the two arrangements described above, these can easily be conceived. The combined effect of the nut-screw system should be able to be carried out, for example, by means of a screw jack of translative or rotative motion, or an electromagnetic motor drive acting either upon the screw or the nut, and one of the two constitutents that is, the screw or nut, should be able to be removed by rotating the same relative to the other, by means of the screw jack, electromagnet or motor means which can in turn be electrically, pneumatically, or hydraulically controlled. Furthermore, the spindle carrying holder is able to be oriented with precision upon completion of the machining operation by known means so as to permit control of the article proportions and the precise orientation of the new machined article. FIGS. 12, 13 and 14 disclose means for mounting machining tools upon the sheath 36 which are adapted for making the grooves 3 for piston rings within pistons 19 of internal combustion engines. In addition to the cartridges 45 and 45' carrying the tools 54 and 54', another cartridge 59 is also provided for carrying the drainage tools 60 shown in FIG. 13, the lateral positions of which are regulated by means of screws 63 and the longitudinal positions of which are regulated by means of rear thrust screws 62, screws 61 serving as limit means for screws 62 and 63.

There is also represented in FIG. 14, a tool carrier upon which is mounted tools 64 for the chamfering of grooves 3. At the end of a previous cycle, after the opertions for fine finishing of the surface have been performed, the sheath 36 is rapidly rotated through an angle C, as seen in FIG. 12, in order to release the tool 54 and bring the tools 60 adjacent the machined article, whereupon the rapid movement is succeeded by a slow rotation movement by known means, not shown, which are regulated by continuous current, pneumatic or hydraulic motor means, whereby the tools contact the article. At the end of the run, a brief delay is enacted and then the tools 60 are retracted.

Figure 11:
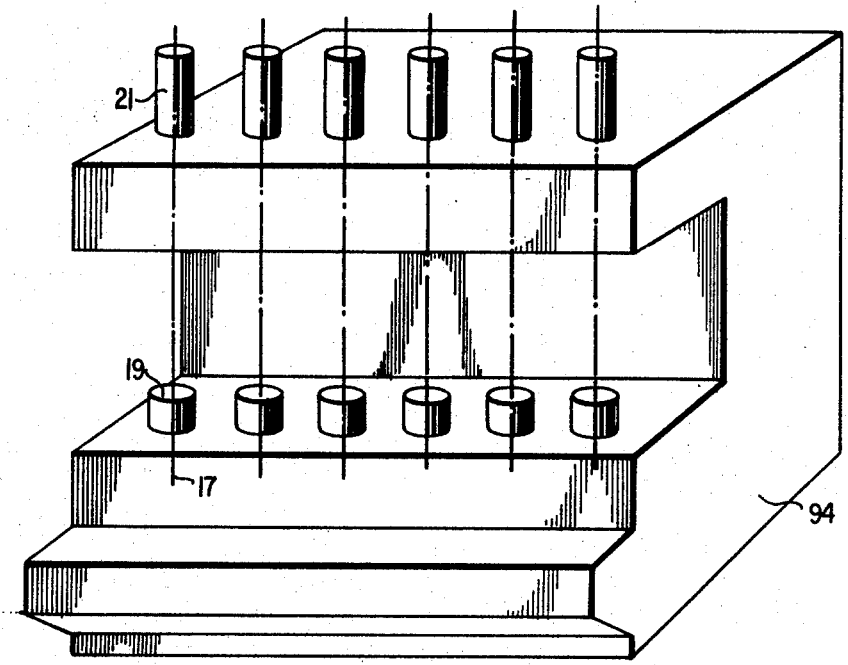
FIG. 11 is a perspective view of an assembly of lathes upon which the articles and the screw-jacks are schematically shown.

In FIG. 11, there is represented a production unit within which the frameworks are assembled in side-by-side fashion so as to form a C-shaped block 94 having the spindles 17 appropriately aligned and bearing the articles for machining 19. Within the upper section of block 94, and so disposed with respect to the spindles, are the screw jacks 21 which assure the tightening of the articles upon the nose portions of the spindles 17. In this manner it is possible to include these production units into a continuous chain of manufacture for mass production, including means for transferring articlecs to be machined, the transportation of articles upon which rough finishing has been completed, means for fine finishing the articles, and means for removal of the articles.

These reproduction lathes are particularly well adapted for finishing the pistons of internal combustion engines. They are capable of correctly attaining the outer barrel form of these articles and permitting the performance of machining operations which necessitate abrupt feeding and retraction strokes of the tools and, finally, a procedurue employing slow controlled strokes. Thus, where applicable, they are capable of being used as finishing lathes or for reworking other articles.

Obviously, numerous variations and modifications of the present invention are possible in light of the above teachings. It is to be understood therefore that within the scope of the appended claims the invention may be practiced otherwise than as specifically described herein.

What is claimed as new and desired to be secured by Letters Patent of the United States is:

1. Reproduction lathe for the machining of articles by tool means having associated therewith sensing means for engaging a reproduction template comprising:

a framework upon which are rotatably mounted two parallel spindles for respectively carrying said article to be machined and said reproduction template;

a machining sheath carriage disposed about said template spindle, which is translatably movable along and rotatably movable about its longitudinal axis;

at least one support means detachably mounted upon said sheath so as to extend perpendicular to the axes of said spindles; and tool means disposed exteriorly of said sheath and sensing means disposed interiorly of said sheath, said tool and sensing means being secured to said support means at opposite ends thereof, whereby said tool means is simultaneously moved in accordance with the translatable movement of said sheath and the relative oscillating movement resulting from the action of said reproduction template upon said sensing means with which said sensing means is engaged.

2. Reproduction lathe according to claim 1, wherein:
said tool and said sensing means are connected by means of a rod;
at least one elastic member interposed between said rod and said support means for supporting said rod relative to said support means and for permitting deflection or movement of said rod only in a direction perpendicular to said spindles; and
spring means being interposed between said support means and a portion of said rod for biasing said rod and said sensing means in said direction perpendicular to said spindles so as to maintain said sensing means in contact with said template.

3. Reproduction lathe according to claim 2 wherein said elastic member defines an enclosed area containing a lubricating medium whereby said lathe components and sensing means disposed within said area are able to be maintained within said lubricating medium.

4. Reporduction lathe according to claim 2 wherein said elastic member comprises a metallic membrane.

5. Reproduction lathe according to claim 2 wherein said rod carrying said tool means and said sensing means is guided at one end thereof by means of a guide block and the other end thereof is secured to said elastic member.

6. Reproduction lathe according to claim 2 wherein two tools for semi-finishing and finishing operations respectively, are mounted at one extremity of said rod while said sensing means is carried at the other extremity of said rod.

7. Reproduction lathe according to claim 2 wherein said sensing means is mounted upon a lever secured to said support means, the position of said sensing means being angularly displaced from the axis of said rod.

8. Reproduction lathe according to claim 1 wherein a plurality of support means respectively supporting machining tools are angularly disposed about and supported upon said machining sheath whereby rotation of said sheath each of said tools may be selectively moved to a working position.

9. Reproduction lathe according to claim 1 wherein said machining sheath is secured upon a fixed sheath surrounding said template spindle and is slidably movable upon said fixed sheath through means of a nut and bolt assembly which is rotatably driven by means of a motor, whereby said carriage sheath may be raised or lowered so as to facilitate performance of the maching operations.

10. Reproduction lathe according to claim 9 wherein said machining sheath further includes at least one key groove within which there is engaged a pivoting crown driven by means of a motor, whereby said machining sheath may be angularly displaced relative to said fixed sheath.

11. Reproduction lathe according to claim 1 wherein said spindle associated with said article to be machined is eccentically mounted within a sheath which includes means rotatably mounting the same upon the apparatus framework.

12. Reproduction lathe according to claim 11 wherein said rotatably mounted sheath is secured within an eccentric bushing;
whereupon rotation of said bushing permits variations in the angle of the axis of said spindle carrying holder relative to the axis of said template spindle.

13. Reproduction lathe according to claim 12 wherein said means for rotatably mounting said spindle sheath includes:
rotatably driven screw means associated with an end fitting secured to one portion of said sheath for rotating said sheath in a counterclockwise direction, and
spring biasing means associated with a portion of said sheath diametrically opposite said end fitting tending to rotate said sheath in a clockwise direction
whereby said sheath may be rotated by said driven means against the biasing action of said spring means so as to adjust the spacing between said spindles.

14. Reproduction lathe according to claim 13 wherein said apparatus further includes piston means connected to said rotatably driven screw means and said sheath;
whereby the rapid angular displacement of said sheath is facilitated.

15. Reproduction lathe according to claim 14 wherein said rotatably driven screw means comprises a screw jack.

16. Reproduction lathe according to claim 14 wherein said rotatably driven screws means further includes pinion means secured thereon for engaging another pinion secured upon the driven shaft of a motor;
whereby the spacing between said spindles may be altered.

17. Reproduction lathe according to claim 16, wherein said rotatably driven screw means has associated therewith angular displacement indicating means whereby actuation of said motor, automatic correction in accordance with the desired dimensions of the articles may be facilitated.

18. Reproduction lathe according to claim 1 wherein said apparatus further includes pulley and belt means associated with a drive motor for rotating said spindles.

19. Reproduction lathe according to claim 1 wherein said tool means are rigidly secured upon said sheath so as to effect machining by a slow stroke operation of said tools as a result of the slow rotatable movement of said sheath.

20. Reproduction lathe according to claim 1 wherein said apparatus framework has a C-shaped cross-section which is capable of being assembled in a side-by-side relationship with other similarly configured lathes so as to form a multi-spindle machine for accomplishing lathing operations under mass production conditions.

21. Reproduction lathe according to claim 1 wherein said apparatus further includes means for rotating said spindles at the same angular velocity.

* * * * *